(12) United States Patent
Birke et al.

(10) Patent No.: US 9,728,807 B2
(45) Date of Patent: Aug. 8, 2017

(54) ELECTROCHEMICAL OR ELECTRIC LAYER SYSTEM, METHOD FOR THE PRODUCTION AND USE THEREOF

(75) Inventors: Peter Birke, Glienicke/Nordbahn (DE); Olaf Böse, Berlin (DE); Michael Keller, Berlin (DE); Michael Schiemann, Berlin (DE); Hans-Georg Schweiger, Ingolstadt (DE)

(73) Assignee: Continental Automotive GmbH, Hannover (DE)

( * ) Notice: Subject to any disclaimer, the term of this patent is extended or adjusted under 35 U.S.C. 154(b) by 1249 days.

(21) Appl. No.: 13/698,801

(22) PCT Filed: May 16, 2011

(86) PCT No.: PCT/EP2011/057869
§ 371 (c)(1),
(2), (4) Date: Jan. 29, 2013

(87) PCT Pub. No.: WO2011/144563
PCT Pub. Date: Nov. 24, 2011

(65) Prior Publication Data
US 2013/0122398 A1 May 16, 2013

(30) Foreign Application Priority Data
May 17, 2010 (DE) .......... 10 2010 020 738

(51) Int. Cl.
*H01M 10/0562* (2010.01)
*H01M 6/18* (2006.01)
(Continued)

(52) U.S. Cl.
CPC ........ *H01M 10/0562* (2013.01); *H01G 9/025* (2013.01); *H01G 9/15* (2013.01);
(Continued)

(58) Field of Classification Search
CPC ..... H01G 9/025; H01G 9/15; H01M 10/0525; H01M 10/0562; H01M 2300/0068;
(Continued)

(56) References Cited

U.S. PATENT DOCUMENTS 6,589,690 B1 * 7/2003 Sato .............. H01M 2/0275
29/623.1
7,183,017 B2 2/2007 Taft, III et al.
(Continued)

FOREIGN PATENT DOCUMENTS

DE          3007631 C2   7/1989
DE         19948548 B4   4/2006
(Continued)

*Primary Examiner* — Carlos Barcena
(74) *Attorney, Agent, or Firm* — Laurence A. Greenberg; Werner H. Stemer; Ralph E. Locher

(57) ABSTRACT

An electrochemical or electric layer system, having at least two electrode layers and at least one ion-conducting layer disposed between two electrode layers. The ion-conducting layer has at least one ion-conducting solid electrolyte and at least one binder at grain boundaries of the at least one ion-conducting solid electrolyte for improving the ion conductivity over the grain boundaries and the adhesion of the layers.

19 Claims, 1 Drawing Sheet

(51) Int. Cl.

| | |
|---|---|
| *H01M 8/10* | (2016.01) |
| *H01G 9/025* | (2006.01) |
| *H01G 9/15* | (2006.01) |
| *H01M 4/04* | (2006.01) |
| *H01M 4/06* | (2006.01) |
| *H01M 4/08* | (2006.01) |
| *H01M 4/131* | (2010.01) |
| *H01M 4/136* | (2010.01) |
| *H01M 4/1391* | (2010.01) |
| *H01M 4/1397* | (2010.01) |
| *H01M 4/62* | (2006.01) |
| *H01M 4/66* | (2006.01) |
| *H01M 4/86* | (2006.01) |
| *H01M 4/88* | (2006.01) |
| *H01M 6/40* | (2006.01) |
| *H01M 8/0226* | (2016.01) |
| *H01M 8/124* | (2016.01) |
| *H01M 10/0525* | (2010.01) |
| *H01M 8/1016* | (2016.01) |

(52) U.S. Cl.
CPC ........... *H01M 4/0404* (2013.01); *H01M 4/06* (2013.01); *H01M 4/08* (2013.01); *H01M 4/131* (2013.01); *H01M 4/136* (2013.01); *H01M 4/1391* (2013.01); *H01M 4/1397* (2013.01); *H01M 4/621* (2013.01); *H01M 4/66* (2013.01); *H01M 4/666* (2013.01); *H01M 4/8652* (2013.01); *H01M 4/8668* (2013.01); *H01M 4/8839* (2013.01); *H01M 6/18* (2013.01); *H01M 6/188* (2013.01); *H01M 6/40* (2013.01); *H01M 8/0226* (2013.01); *H01M 8/1016* (2013.01); *H01M 8/124* (2013.01); *H01M 10/0525* (2013.01); *H01M 4/0407* (2013.01); *H01M 4/663* (2013.01); *H01M 4/664* (2013.01); *H01M 2300/0068* (2013.01); *H01M 2300/0091* (2013.01); *Y02P 70/56* (2015.11); *Y10T 29/49115* (2015.01)

(58) Field of Classification Search
CPC ....... H01M 2300/0091; H01M 4/0404; H01M 4/0407; H01M 4/06; H01M 4/08; H01M 4/131; H01M 4/136; H01M 4/1391; H01M 4/1397; H01M 4/621; H01M 4/66; H01M 4/663; H01M 4/664; H01M 4/666; H01M 4/8652; H01M 4/8668; H01M 4/8839; H01M 6/18; H01M 6/188; H01M 6/40; H01M 8/0226; H01M 8/1016; H01M 8/124; Y02P 70/54; Y02P 70/56; Y10T 29/49115

See application file for complete search history.

(56) References Cited

U.S. PATENT DOCUMENTS

| | | | |
|---|---|---|---|
| 7,479,350 | B1 | 1/2009 | Neumann et al. |
| 2003/0154886 | A1* | 8/2003 | Anhorn ................... C04B 28/26 106/628 |
| 2007/0048617 | A1* | 3/2007 | Inda .......................... C03C 4/18 429/304 |
| 2010/0151335 | A1 | 6/2010 | Senga et al. |
| 2011/0281173 | A1* | 11/2011 | Singh ..................... H01M 2/16 429/306 |

FOREIGN PATENT DOCUMENTS

| | | |
|---|---|---|
| EP | 1760819 A2 | 3/2007 |
| GB | 2070846 A | 9/1981 |
| WO | 2004015801 A1 | 2/2004 |
| WO | 2007154049 A1 | 2/2007 |

* cited by examiner

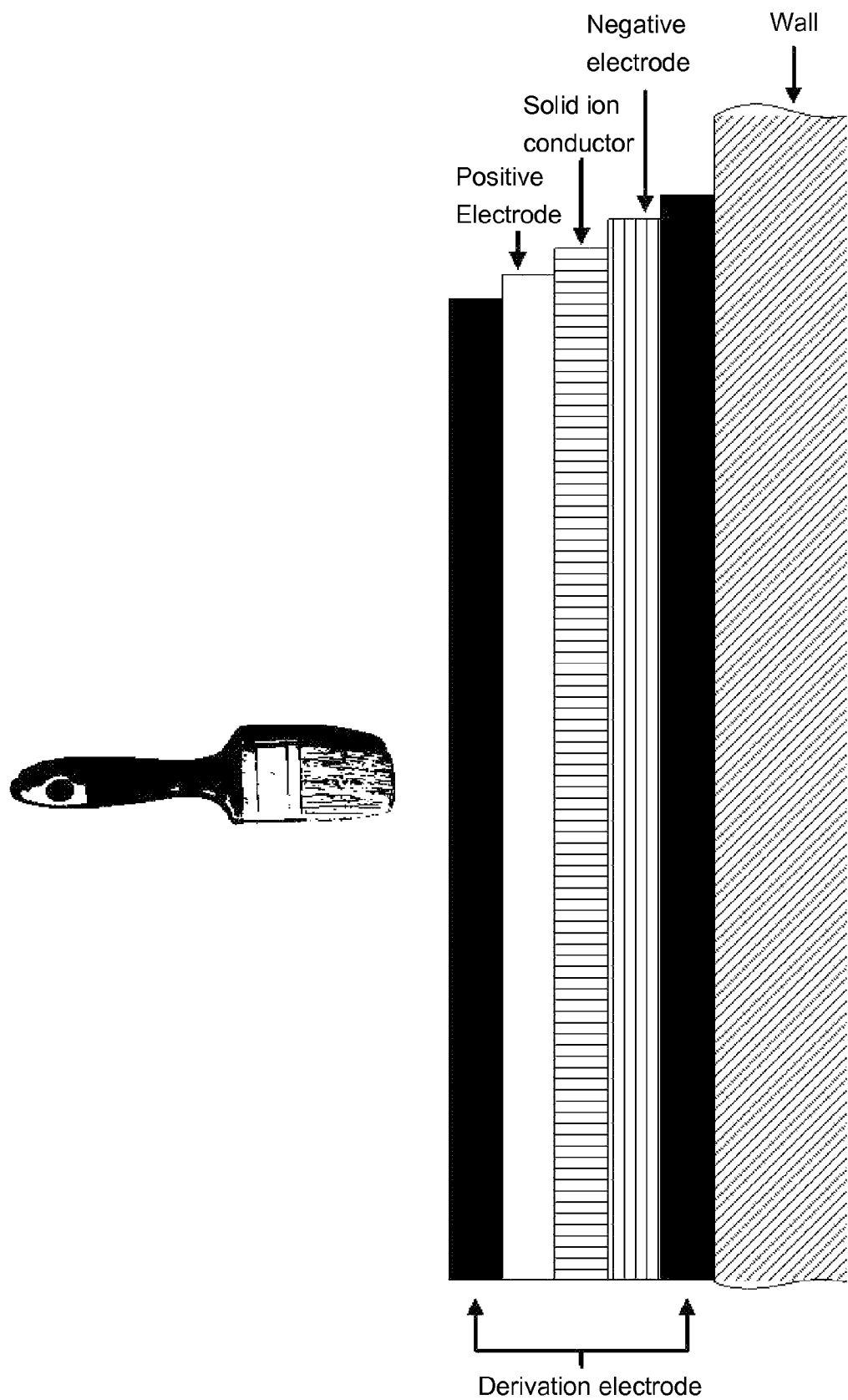

ELECTROCHEMICAL OR ELECTRIC LAYER SYSTEM, METHOD FOR THE PRODUCTION AND USE THEREOF

BACKGROUND OF THE INVENTION

Field of the Invention

The present invention relates to an electrochemical or electrical layer system having at least two electrode layers and at least one ion-conducting layer arranged between two electrode layers, which contains at least one ion-conducting solid electrolyte and at least one binder at the grain boundaries of the at least one ion-conducting solid electrolyte to improve the ion conductivity through the grain boundaries and to improve the adhesion of the layers. The electrochemical or electrical layer systems can be configured as primary batteries, accumulators, solar cells, capacitors or fuel cells. The invention likewise relates to a process for producing energy storage or energy generation systems which are applied to walls or other large-area substrates.

Apart from ceramic materials for structural applications, electrical functional ceramics have attained considerable importance in recent decades. Electrical functional ceramics having a high mobility of ions, in particular, have already found technological uses. Known examples are cubic $ZrO_2$ as oxygen ion-conducting solid electrolyte in lambda sensors and in high-temperature fuel cells which are already achieving current densities of some amperes per square centimeter. Solid sodium-β''-aluminum oxide is used both in the sodium-sulfur cell and in the zebra battery ($Na$—$NiCl_2$) for ion transport. These accumulators are suitable for use in electrotraction because of their high energy densities. In the case of electrochemical systems having liquid or gaseous electrolytes, ceramic electrolytes not only perform the function of ion transport but are at the same time structural parts in the form of separators or membranes. The range of possible uses for ceramic electrolytes is very broad even today and encompasses fuel cells, electrolysis cells, high-performance batteries, thermoelectric converter systems, electrochromic arrangements and sensors of a variety of types.

However, these uses are still restricted to bulk materials which can be produced by conventional methods of powder compaction and sintering. Here, "bulk" means essentially "volume", viz. three-dimensional in contrast to two-dimensional and thin layers. Although compact shaped bodies having good mechanical properties are obtained in this way, they have long transport paths for the ions whose conduction is in many cases hindered by impurities at the grain boundaries. The maximum available power depends on the kinetics of the electrode reaction and the throughput of ions per unit time in the electrolyte. The time required by the ions to migrate through the electrolyte is determined by the speed of the ions and the thickness of the electrolyte. This can also be extended to the electrodes when these can be considered to be ion conductors having additional electronic conduction via appropriate band structures. This is virtually without exception in the case for present-day Li ion batteries. The mixed conductors in the electrodes will therefore also be considered to be ion-conducting materials or solid electrolytes in the following.

To accelerate the ion conduction in such solid ceramic ion conductors, there are two ways of proceeding: the velocity of the ions in the electrolyte is increased or their path is shortened. The first strategy leads to success when the system can be operated at an increased temperature and/or the transition resistances at the grain boundaries can be reduced. The second strategy, namely shortening of the path lengths, can be achieved by use of thinner layers and/or larger areas. This also makes it possible to use compounds which have a poor ion mobility but because of their thermodynamic properties are particularly attractive for specific applications. Such materials are naturally ruled out for bulk applications but can be used in the form of thin layers since the diffusion paths are greatly reduced. This likewise applies to mixed conductors which are used as electrode materials.

Such electrochemical elements allow an extremely compact construction having the highest possible energy densities since inactive material can be reduced to a minimum and multilayers are extremely easy to realize. A further prominent property of these batteries is their safety since virtually all oxidic solid electrolytes are nontoxic materials having high Gibbs bonding energies. However, solid-state electrolytes have a conductivity which is a number of orders of magnitude lower than that of liquid electrolytes.

However, substantial efforts to extend studies on ceramic single crystals or sintered bodies to thin layers of the same material have been made only in this decade. It is to be expected that the use of thin layers will offer further considerable advantages, especially for high-power batteries, e.g. an increase in the electroactive mass and thus especially the volumetric energy density as a result of a reduction in or complete omission of the volume-filling carbon-based conductivity improvers in the electrodes, the binder, the liquid electrolyte and also the pores in which the liquid electrolyte is usually accommodated in conventional batteries. However, miniaturization of the system with the associated savings in materials and costs and the reduction in the sluggishness and the resistance is made difficult by the fact that at present there is no corresponding technology available for producing such systems having defined properties. Commercialization has hitherto likewise been made difficult by selection of a suitable and inexpensive process for achieving sufficient layer thicknesses of high quality in a short time and arranging these layers in a layer composite.

Achievement of thinner layers for a broad range of applications has hitherto foundered on the conductivity over the grain boundaries. In Li ion cells, the active materials in the electrodes are usually produced as powder via solid-state reactions and the powder is mixed into a paste with binders, solvents and conductivity improvers and spread to form a layer. Ion transport over the grain boundaries is effected by the liquid, generally organic electrolyte which can also be present in gelled form, but has the abovementioned disadvantages compared to a solid-state battery.

Known rechargeable batteries are encountered in large quantities on the consumer market or as starter batteries. These known applications require either high practical energy densities in a very small space (consumer market), which do not permit operation at relatively high temperatures because of the additional volume, or in the case of the starter battery require a small heating battery at low temperatures for the solid-state battery, and the solid-state battery then again appears to be superfluous. New applications such as electrical driving or "load leveling" make a solid-state battery with its abovementioned advantages appear to be very advantageous even for operation at high temperatures. However, in order to prevent these temperatures from becoming too high, sufficient charge transport over the grain boundaries has to be ensured and a process for the simple production of such a battery has to be provided.

BRIEF SUMMARY OF THE INVENTION

It was therefore an object of the present invention to provide electrochemical or electrical systems having improved ionic conductivity. It was likewise an object of the present invention to provide systems which can be produced in a simple way and thus inexpensively and can be used in a wide variety of applications.

In accordance with the invention, this object is achieved by the electrochemical or electrical layer system and the process for producing energy storage or energy generation systems, and uses thereof with features as recited in the claims appended hereto.

According to the invention, an electrochemical or electrical layer system having at least two electrode layers and at least one ion-conducting layer arranged between two electrode layers is provided. The ion-conducting layer contains at least one ion-conducting solid electrolyte and at least one binder at the grain boundaries of the at least one ion-conducting solid electrolyte in order to improve the ion-conductivity over the grain boundaries and to improve the adhesion of the layers.

The electrochemical layer system preferably additionally has at least two power outlet electrode layers.

The ion-conducting solid electrolyte preferably consists of an electrical functional ceramic and/or an electrically conductive polymer.

According to the invention, preference is given to at least part of the layers of the electrochemical or electrical layer system being able to be produced from a dispersion. The dispersion consists of dispersed particles in a dispersion medium.

The abovementioned layers preferably have a structure analogous to or comparable with paints or varnish layers. However, they can also be thick layer, scumbles, glazes or enamels. The layers can also have a structure analogous to render, mortar or concrete.

An alkali metal silicate, water glass, preferably lithium water glass, is preferably used as binder at the grain boundaries. These alkali metal silicates have silica-forming properties, i.e. a particularly good bond is achieved by a silica formation process. These generally soluble silicates, in particular in the case of sodium, potassium and lithium silicates, are generally not chemical substances having a defined stoichiometry (with a particular chemical formula and molecular weight), but instead glasses or aqueous solutions of glasses which are obtained by combining alkali metal oxide and silicon oxide in various ratios. The composition of soluble alkali metal silicates is generally described by the formula $M_2O \cdot nSiO_2$. Here, M is either Na, K or Li and n is the molar ratio (MR) which indicates the number of mol of silicon dioxide ($SiO_2$) per mole of alkali metal oxide ($M_2O$). In industry, it is routine practice to report the weight ratio (WR) of $SiO_2:M_2O$. This is calculated from the molar ratio according to the following relationships:

| | |
|---|---|
| Sodium silicates | MR = 1.032 · WR |
| Potassium silicates | MR = 1.566 · WR |
| Lithium silicates | MR = 0.5 · WR |

All the above-mentioned alkali metal silicates are alkaline substances, with the pH values of the concentrated products generally being in the range from 10 to 13. The alkalinity of the products increases in inverse proportion to the molar or weight ratio. Starting materials for preparing water glass are silica sand and alkali metal carbonate (e.g. sodium carbonate for sodium water glass or potash for potassium water glass). All raw materials must be of high purity since when certain limits are exceeded, the impurities have an adverse effect on the melting process and the product properties. Depending on the desired composition, sand and alkali metal carbonate are mixed together in the required weight ratio and the mix is continuously fed to the melting furnace: the melting process takes places at temperatures in the range from 1200° C. to 1500° C. The solidified, cooled melting product (lump glass) is dissolved under superatmospheric pressure and at elevated temperature in rotating or stationary autoclaves. The solutions formed in that way are filtered and serve as starting materials for appropriate modifications or are marketed directly.

Melting-Dissolution Process:

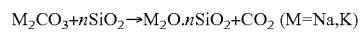

$$M_2CO_3 + nSiO_2 \rightarrow M_2O \cdot nSiO_2 + CO_2 \quad (M=Na,K)$$

A further possibility, in particular for the production of low-modulus water glasses, is wet digestion (hydrothermal process). Here, for example, silica sand is slurried in the appropriate alkali metal hydroxide solution and dissolved at elevated pressure and temperature.

Hydrothermal Process (Wet Digestion Process):

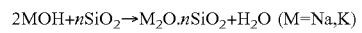

$$2MOH + nSiO_2 \rightarrow M_2O \cdot nSiO_2 + H_2O \quad (M=Na,K)$$

Alkali metal silicates have been produced for several thousand years. On an industrial scale, they have been produced and employed since the beginning of the 19th century. These long years of experience in handling and also comprehensive toxicological and ecological studies demonstrate that the responsible and proper handling (taking account of the in-principle alkaline character) of this class of products particularly advantageously poses no danger to human beings and the environment.

However, emulsion paints, preferably those based on synthetic resin and synthetic rubber, acrylic paints, oil paint, wood paint, lime paint, lacquer, clay paint, suspensions containing methylcellulose, starch, mortar, can also be used as binders. Instead of the silicates mentioned, it is also possible to use metal carbonates, oxides, hydroxides, sulfides, sulfites, sulfates, nitrides, nitrites, nitrates, borides, borates, carbides, carbonates, silicides, acetates, phosphides, phosphites, phosphates. Clays, fibrous silicates and titanates can likewise be used.

DESCRIPTION OF THE INVENTION

In a particular embodiment, the binder at the grain boundaries can also be a flux. Examples are waxes, resins, in particular rosin, Teflon, borates or mica, preferably lithium mica such as lepidolite. These fluxes are liquefied by means of input of heat. This input of heat is preferably effected by means of a thermal radiation source, furnace, in particular baking furnace, a hot air blower, a maser, a laser, microwaves or particle bombardment, friction, joule heat (resistance) and inductive heating.

In a further embodiment, the binder at the grain boundaries can also be a heterogeneous (suspension) or homogeneous mixture containing a nanocrystalline alkali metal carbonate, oxide, hydroxide, sulfide, sulfite, sulfate, nitride, nitrite, nitrate, boride, borate, carbide, carbonate, silicide, acetate, phosphide, phosphite, phosphate.

In a further embodiment, the binder at the grain boundaries is an adhesive which cures in air either thermally or by means of electromagnetic radiation.

In a further particular embodiment, the functional ceramic has at least partial solubility in at least one binder, so that the functional ceramic is dissolved in regions at the grain boundaries on contact with the at least one binder.

According to a further embodiment, the electrochemical or electrical layer system is hermetically sealed against external influences, in particular against moisture, by the at least one binder.

In a further embodiment, the binder at the grain boundaries is a mixture containing at least one of the constituents ammonium phosphate, ammonium dihydrogenphosphate or diammonium hydrogenphosphate, at least one alkali metal carbonate, oxide, hydroxide, sulfide, sulfite, sulfate, nitride, nitrite, nitrate, boride, borate, carbide, carbonate, silicide, acetate, phosphide, phosphite, phosphate and additionally contains silicon dioxide, preferably in fumed form, where the mixture described is reacted at elevated temperature and gives an excellent putty composition.

In all the possible embodiments mentioned, pressure can be exerted at the same time during the production of the system and/or permanently by means of an appropriate housing.

A particular aspect of the system of the invention is that a paint, e.g. on surfaces of vehicles or exterior walls of buildings, which can be utilized as electrochemical or electrical system is produced.

An additional sealing layer or impregnation can protect the layer system of the invention against environmental influences, e.g. moisture.

At the same time, the selection of suitable active materials in the electrodes, e.g. lithium titanate ($Li_4Ti_5O_{12}$) on the negative side or lithium iron phosphate ($LiFePO_4$) on the positive side, can make the use of water glass as substance at the grain boundaries possible. The water bound in the substance (water of crystallization) is not decomposed or remains virtually undecomposed after long periods of time because of the low chemical potentials. As solid electrolyte, use is made, for example, of $Li_{1.3}Al_{0.3}Ti_{1.7}(PO_4)_3$. In general, alkali metal, alkaline earth metal, earth metal, transition metal, rare earth oxides, hydroxides, sulfides, nitrides, nitrites, nitrates, borides, borates, carbides, carbonates, silicides, silicates, acetates, phosphides, phosphites, phosphates, lithium oxides, sulfides, sulfites, sulfates, nitrides, nitrites, nitrates, borides, borates, carbides, carbonates, silicides, acetates, phosphides, phosphites, phosphates, Li alloys and various carbon modifications are conceivable as electrode materials and alkali metal, alkaline earth metal, earth metal, transition metal, rare earth oxides, hydroxides, sulfides, nitrides, nitrites, nitrates, borides, borates, carbides, carbonates, silicides, acetates, phosphides, phosphites, phosphates, lithium oxides, sulfides, sulfites, sulfates, nitrides, nitrites, nitrates, borides, borates, carbides, carbonates, silicides, silicates, acetates, phosphides, phosphites, phosphates are conceivable as solid electrolytes.

The electrode layers particularly preferably contain an active material, for the cathode selected in particular from the group consisting of manganese dioxides, lithium-intercalated transition metal oxides, lithium-intercalated phosphates, in particular lithium-intercalated iron phosphates and blends thereof, sulfur, oxygen and metal fluorides, for the anode selected in particular from the group consisting of lithium-intercalated titanates, carbon modifications, in particular graphite, hard carbon, soft carbide and blends thereof.

Furthermore, the electrode layers and/or the power outlet electrode layers preferably contain a conductivity improver, in particular selected from the group consisting of carbons, in particular graphite and carbon blacks, carbides, nitrides, chromites and mixtures thereof. Compared to electrochemical or electrical systems known from the prior art, the layer system of the invention is associated with the following advantages:

The production of the layers and of the entire layer system is simple to carry out since the process makes do without the use of solvents, in particular organic solvents as are indispensible in the production process for standard Li ion cells, neither binders nor plasticizers are required, with the latter generally having to be extracted again in a complicated fashion. Multilayer structures comprising many single cells are simple to realize.

A separator is no longer required since the solid-state electrolyte assumes this function. Since no pore structure is present, the current distribution is significantly more homogeneous. In a conventional separator which stores a liquid electrolyte, there are nonconductive, electrically inactive "dead" zones between the pores (about 30-40%). Only part of the actual area is thus utilized, as a result of which the current flows inhomogeneously in the separator cross section.

It is possible to use, if appropriate, carbon-based or ceramic electron conductors, e.g. lanthanum strontium chromite, instead of metallic conductors, depending on the chemical potential of the active electrode materials selected. In the present case, these alternative electron conductors have the advantage that they can be produced as layers in exactly the same was as the electrodes and the solid electrolyte and can be contacted much better than metal foils in the layer composite formed. The use of carbon-based power outlet leads reduces the weight since copper is generally used as negative power outlet lead in Li ion cells.

Considerable advantages are obtained in respect of the practical energy density, in particular the volumetric energy density. Conductivity improvers in the electrodes (in general carbons having at least one two-decimal-point BET, i.e. a relatively high specific surface area and thus a high volume) are omitted entirely or are considerably reduced. Neither an electrolyte nor a separator are required.

Safety advantages are obtained since the layer systems no longer contain an organic electrolyte which is ultimately responsible, despite safer cathode materials such as iron phosphate, for the combustibility of Li ion batteries. Likewise, combustible binders or polymer-based separators and the high proportions of carbon are absent. The direct connection in series of single cells within a battery, i.e. within a housing, is unproblematical in terms of safety. Passive safety components and complicated electronics can therefore be omitted entirely or at least partly.

The invention leads to advantages in respect of the life of the battery. Thus, decomposition reactions do not occur since, even when the electrolyte is not thermodynamically stable with the electrodes, only the Li ions are sufficiently mobile over extremely long periods of time within a large temperature window (up to several hundred degrees). The system is thus kinetically stable in respect of secondary reactions. These advantages considerably improve the expected life, both in respect of storage and operation, in particular at high temperatures. Spontaneous discharge is vanishingly small. Thin film batteries produced by means of PVD (physical vapor deposition) or CVD processes easily achieve 100 000 full cycles.

The disadvantage that solid ion conductors are poor conductors at low temperatures can be changed into an advantage since the parasitic secondary reactions are also virtually prevented at high temperatures. Thus, in the case of large batteries, in particular for automobile applications, it is possible to dispense with a cooling system entirely. Operation of a relatively large battery at relatively high temperatures of 80-120° C. is an alternative industrially. This generally makes no sense only in the case of small batteries for the consumer market. Since the battery permits a high temperature window, the additional temperature rise also does not have to be prevented by cooling during operation. Since ion conductors are heat conductors, their conductivity increases with temperature (Arrhenius dependency) and the power loss therefore decreases at the same time with a rise in temperature and the risk of spontaneous overheating is prevented. Even today selected solid ion conductors achieve conductivities in the abovementioned temperature window of more than $10^{-2}$ S/cm, which corresponds to the conductivity of liquid organic electrolytes in present-day Li ion batteries. There are therefore considerable advantages not only on the cell side but also in terms of the total system in the practically achievable energy density since only an insulating housing but no active cooling is required. There is also the advantage that water which can lead to undesirable secondary reactions in an Li ion cell is driven off at temperatures above 100° C. at atmospheric pressure and cannot condense during operation.

The layers of power outlet electrodes, electrodes and solid electrolytes remain in contact. Gas evolution due to the decomposition of the organic electrolyte, which can lead to decontacting of the layers as in Li ion cells, does not occur.

The high operating temperatures may make a symmetrical arrangement of a circuit superfluous since all processes participating in charge transport are activated while secondary reactions are virtually completely suppressed. An electrical management system can thus be dispensed with.

It is possible to use 5 volt materials in the positive electrode. These are transition metal oxides having a voltage of more than 5 V relative to Li. Their use has hitherto foundered essentially on the decomposition (oxidation) of the liquid organic electrolyte. The advantage is a higher energy density, in which the total voltage is a factor. The invention likewise provides a process for producing energy storage or energy generation systems, in which an electrochemical or electrical layer system as described above is applied to walls or other large-area substrates. For the application of at least one layer of the electrochemical or electrical layer system, a dispersion of particles dispersed in a dispersion medium is provided and the dispersion is applied, in particular, by means of painting techniques.

The processing as in the case of a paint allows simple production and the effective utilization of generally unutilized surfaces. At the same time, the above-mentioned conductivity disadvantage is effectively compensated by the sheet-like design and the thin layers, especially when the surface to which the layer system is applied is located, for example, in a temperature-controlled interior space, so that low temperatures cannot occur as in an exterior region. Likewise, the paint as starting material is easy to produce and will generally keep for a number of years; it only has to be stirred up (suspension) before use. A field of application like combination with solar cells additionally requires the capability of being able to take up very small currents, for which the proposed system is particularly suitable. Such cells can also be utilized as a type of transformer and buffer on the solar cell, transformer in the sense that the rather unfavorable voltage curve of the solar cell is converted into a voltage curve having a plateau-like profile.

The electrochemical or electrical layer systems are used as primary battery, as accumulator, as solar cell, as capacitor or as fuel cell.

EXAMPLE

Paintable compositions are produced as aqueous paintable composition by dispersing from about 75 to 80% by volume of active material together with from 20 to 25% of Li water glass in water as solvent. The active material of the negative electrode is lithium titanate $Li_4Ti_5O_{12}$, that of the solid electrolyte is lithium aluminum titanium phosphate $Li_{1.3}Al_{0.3}Ti_{1.7}(PO_4)_3$ and that of the positive electrode is lithium iron phosphate $LiFePO_4$. The power outlet electrodes contain about 80% by volume of finely particulate graphite which is appropriately suspended in water glass as binder. The compositions are painted sequentially on a wall in the order negative power outlet electrode, negative electrode, electrolyte, positive electrode, positive power outlet electrode (see FIG. 1). Each application is followed by a drying step for a time of several hours.

The invention claimed is:

1. An electrochemical system, comprising:
   at least two electrode layers;
   at least one ion-conducting layer arranged between said at least two electrode layers;
   said at least one ion-conducting layer containing at least one ion-conducting solid electrolyte formed with grains and at least one binder at grain boundaries of said grains of said at least one ion-conducting solid electrolyte for improving ion conductivity through the grain boundaries of said ion-conducting layer and adhesion of the electrode and ion-conducting layers;
   said at least one binder being an alkali metal silicate or a water glass disposed at the grain boundaries of said grains of said ion-conducting solid electrolyte.

2. The electrochemical system according to claim 1, having at least two power outlet electrode layers.

3. The electrochemical system according to claim 2, wherein at least one of said electrode and ion-conducting layers is one of a carbon-based or ceramic electron conductor.

4. The electrochemical system according to claim 2, wherein at least one of said electrode and ion-conducting layers is an electrical functional ceramic.

5. The electrochemical system according to claim 2, wherein said layers contain a conductivity improver, selected from the group consisting of carbons, carbides, nitrides, chromites and mixtures thereof.

6. The electrochemical system according to claim 1, wherein said at least one ion-conducting solid electrolyte is an electrical functional ceramic of at least one of Li phosphate, aluminate or silicate, or an electrically conductive polymer which contains lithium tetrafluoroborate, lithium imide or a sulfur-containing Li salt.

7. The electrochemical system according to claim 6, wherein said functional ceramic is dissolved in regions at said grain boundaries in contact with the said at least one binder.

8. The electrochemical system according to claim 1 wherein at least part of said electrode and ion-conducting layers include particles dispersed in a dispersion medium.

9. The electrochemical system according to claim 8, wherein at least part of said electrode and ion-conducting layers is configured as one of paint layers, varnish layers, or thick layers.

10. The electrochemical system according to claim 8, wherein at least part of said electrode and ion-conducting layers is configured as one of scumble, glaze, enamel, render, mortar, or concrete.

11. The electrochemical system according to claim 1, wherein said binder is lithium water glass.

12. The electrochemical system according to claim 1, wherein said at least one binder hermetically seals against external influences including moisture.

13. The electrochemical system according to claim 1, wherein said at least one solid electrolyte is an ion-conducting functional ceramic selected from the group consisting of hydroxides, sulfides, nitrides, nitrites, nitrates, borides, borates, carbides, carbonates, silicides, silicates, acetates, phosphides, phosphites, phosphates, sulfides, sulfites, sulfates of the alkali metals, alkaline earth metals, earth metals, transition metals and rare earth metals and mixtures thereof.

14. The electrochemical system according to claim 1, wherein said electrode layers contain an active material for a cathode selected the group consisting of manganese dioxides, lithium-intercalated transition metal oxides, lithium-intercalated phosphates, lithium-intercalated iron phosphates and blends thereof, sulfur, oxygen and metal fluorides, and for an anode selected from the group consisting of lithium-intercalated titanates, carbon modifications, graphite, hard carbon, soft carbon and blends thereof.

15. The electrochemical system according to claim 1, wherein said electrode and ion-conducting layers have a thickness in the range from about 1 µm to about 1 mm.

16. The electrochemical system according to claim 1, wherein said system is rechargeable.

17. The electrochemical system according to claim 1, wherein said system is one of a primary battery, an accumulator, a solar cell, a fuel cell or a capacitor.

18. A method for storing or generating energy storage, which comprises:
   providing an electrochemical system according to claim 1;
   applying said system to a substrate;
   wherein, at least one layer of said electrochemical system includes particles dispersed in a dispersion medium; and
   applying the dispersion by one of painting, spraying, trowel application and/or doctor blade application.

19. A method for storing or generating energy, which comprises:
   providing an electrochemical system according to claim 1;
   said system being one of a primary battery, accumulator, solar cell, fuel cell or capacitor, and
   electrically connecting said system and storing energy in the system or generating and outputting energy from the system.

* * * * *